United States Patent [19]

Kaneyuki

[11] Patent Number: 4,894,553
[45] Date of Patent: Jan. 16, 1990

[54] ENGINE STARTING AND CHARGING DEVICE
[75] Inventor: Kazutoshi Kaneyuki, Hyogo, Japan
[73] Assignee: Mitsubishi Denki Kabushiki Kaisha, Tokyo, Japan
[21] Appl. No.: 265,860
[22] PCT Filed: Feb. 9, 1988
[86] PCT No.: PCT/JP88/00127
    § 371 Date: Oct. 6, 1988
    § 102(e) Date: Oct. 6, 1988
[87] PCT Pub. No.: WO88/06377
    PCT Pub. Date: Aug. 25, 1988
[30] Foreign Application Priority Data
    Feb. 12, 1987 [JP] Japan .................. 62-30022
[51] Int. Cl.$^4$ ................. H02K 17/12; H02K 17/42
[52] U.S. Cl. ......................... 290/31; 290/46
[58] Field of Search ............... 240/10, 22, 28, 31, 240/46
[56] References Cited
    U.S. PATENT DOCUMENTS
    3,908,130  9/1975  Lafuze ...................... 290/31 X
    3,908,161  9/1975  Messenger ................ 290/46 X
    4,459,536  7/1984  Wirtz ........................ 290/46 X
    4,684,814  8/1987  Radomski ................. 290/31
    4,803,376  2/1989  N'Guyen ................... 290/31 X FOREIGN PATENT DOCUMENTS
    54949  11/1986  Japan .

Primary Examiner—Derek S. Jennings
Assistant Examiner—W. E. Duncanson, Jr.
Attorney, Agent, or Firm—Sughrue, Mion, Zinn, Macpeak and Seas

[57] ABSTRACT

A field coil is divided into the plural number, and each of these field coils is connected in parallel in relation to a battery at the time of engine starting, and in series during the generation of the electric current after engine starting, so that sufficient field electromotive force can be maintained in the event of a battery voltage drop during engine starting, and also a necessary, sufficient field electromotive force can be produced with little current at the time of voltage recovery during generator operation. Consequently, the amount of copper to be used for the field coils and a winding space can be decreased; therefore the present invention is effective to provide a light-weight, small and unexpensive engine starting and charging device.

6 Claims, 5 Drawing Sheets

ENGINE STARTING AND CHARGING DEVICE

FIELD OF THE INVENTION

The present invention relates to an engine starting and charging device that a starting motor for starting an engine and a charging generator driven by the engine to charge a battery are constructed as a unit.

BACKGROUND OF THE INVENTION

An engine starting and charging device of prior art constituted of a starting motor and a charging generator as one unit has been suggested, for example, one disclosed in Laid-Open Japanese Patent No. Sho 61-54949.

FIG. 1 is a sectional view of a prior-art engine starting and charging device disclosed in Laid-Open Japanese Patent No. Sho 61-54949. In FIG. 1, a starting and charging device body 1 comprises revolving-field poles 2a, 2b, a field coil 3, an armature core 4, an armature coil 5, and a crank angle detector 6 as major components.

The revolving-field poles 2a, 2b are a pair of comb-shaped field poles produced of a ferromagnetic material, which are coupled as a unit through a ring 7 of a non-magnetic material such that their magnetic pole sections are arranged alternately in the circumferential direction. The field pole 2a, functioning as a flywheel and also as a clutch carrier described later, is mounted on an engine crankshaft 8, and fixed on the end of the crankshaft 8 by a bolt 9. Numeral 10 is a cutout formed at the side section of the field pole 2a, which, combined with the crank angle detector 6, is used to detect the crank angle; the same number of cutouts as the number of magnetic poles of the field pole 2a are provided at equal intervals around the circumference. The width of the cutout 10 in the circumferential direction makes an angle equal to about one half of 360 degrees divided by the number of the cutouts.

The field coil 3, which is for exciting the field poles 2a, 2b, is mounted on the field core 11. This field core 11 is mounted and fixed to a bracket 12 by bolts, which are not illustrated, facing the field poles 2a, 2b, across slight air gaps a, b in the radial direction.

The armature core 4 is formed by laminating silicon steel sheets, within the inner periphery of which are provided a number of slots for setting the armature coil 5 therein, the armature coil 5 being of a three-phase distributed winding type as a common commutatorless motor. The armature core 4 is properly positioned and fixed in relation to the bracket 12, which is secured by bolts 15 to an engine body 13 together with a housing 14 for securing the armature core 4.

The crank angle detector 6 functions as a signal source that operates an armature current switching circuit which is not illustrated, and uses an oscillation-type proximity switch. This proximity switch is mounted on the bracket 12 such that its detecting element is disposed on the circumferential line where the cutouts 10 of the field pole 2a are provided, and its oscillating conditions vary with the change of inductance at the cutout and non-cutout sections of the field pole 2a, outputting a binary signal "1" or "0" corresponding to the crank angle (field pole position). When a three-phase armature coil 5 is employed, there will be installed three crank angle detectors 6.

Numeral 16 is a clutch for the interruption of transmission of power between the crankshaft 8 and a transmission drive shaft 17, and uses a diaphragm spring clutch comprising a clutch disc 18, a pressure plate 19, a diaphragm spring (disc spring) 20, wire rings 21, 22, and a clutch cover 23. The clutch cover 23 is mounted by bolts 24 to the field pole 2a.

The clutch 16, as is well known, is of such a constitution that when a clutch pedal (not illustrated) is not depressed, the tension of the diaphragm spring 20 is exerted, by leverage, through the pressure plate 19 to the clutch disc 18 mounted on the transmission drive shaft 17, pressing this clutch disc 18 against the side of the field pole 2a to connect the clutch.

When the clutch pedal is depressed, the sleeve, which is not illustrated, slides in the axial direction, pressing the central part of the diaphragm spring 20 in the direction of the arrow C. Therefore the diaphragm spring 20 deflects back on the wire rings 21, 22 as a fulcrum, thus removing a pressure that has been exerted to the clutch disc 18 to disconnect the clutch, and accordingly interrupting the transmission of power between the crankshaft 8 and the transmission drive shaft 17.

FIG. 2 is a drawing showing the general constitution of circuit of the starting and charging device. In this drawing, numeral 25 designates a battery, numeral 26 denotes a key switch, d is a contact on the IGNITION side, and e denotes a contact on the START side. Numeral 27 designates a voltage regulator which controls the electric current flowing into the field coil 3. This functions, in a generating state, to detect the terminal voltage of the battery 25 and control the field current so as to maintain the voltage value at a specific value. The constitution of the voltage regulator is as described below.

Numerals 28, 29 designate split resistors, which are connected to the battery 25. The nodes of these resistors 28, 29 are connected to the base of a transistor 31 through a Zener diode 30.

This transistor 31 functions to operate a power transistor 32 on and off which cuts off the field current. The collector of the transistor 31 is connected to the base of the transistor 32 and also to the contact d on the IGNITION side of the key switch 26 through abase resistor 33. The emitter is grounded.

The collector of the transistor 32 is connected to one end of the field coil 3, and the emitter is grounded. The other end of the field coil 3 is connected to the battery 25. Furthermore, numeral 34 is a flywheel diode which absorbs a surge during the opening and closing of the transistor 32.

The armature current changeover circuit 35 is provided with a current changeover control circuit 36 on its input side, and connected to the contact e on the START side of the key switch 26 through this current changeover control circuit 36. The current changeover control circuit 36 generates a signal for the on-off operation of the current changeover transistors 37 to 42 in accordance with a signal from the crank angle detector 6 for each phase of the armature coil 5.

The current changeover transistors 37 to 42 are arranged in pairs as 37 and 38, 39 and 40, and 41 and 42. Collectors of the transistors 37, 39 and 41 are connected to the positive terminal of the battery 25, while their emitters are connected to the collectors of the transistors 38, 40 and 42. The emitters of these transistors 38, 40 and 42 are grounded.

The base of each of the transistors 37 to 42 is connected to the current changeover control circuit 36, and the nodes of each pair of the transistors 37 and 38, 39 and 40, and 41 and 42 are connected to each phase of the armature coil 5. Numerals 43 to 48 denote diodes constituting a three-phase full-wave rectification circuit for converting the output voltage from the armature coil 5 into d.c. voltage during the operation of this device as a generator after the starting of the engine.

Next, the operation of the starting and charging device of the above-mentioned constitution will be explained. When the key switch 26 is placed in the START position with the engine left stationary, the electric current flows into the field coil 3 through the voltage regulator 27 and into the armature coil 5 through the armature current changeover circuit 35, thereby producing a torque at the field poles 2a, 2b to turn the directly coupled crankshaft 8.

When the field poles 2a, 2b begin to rotate, the crank angle detector 6 detects the position of the field poles, and the electric current flowing into the armature coil 5 is changed over by the armature current changeover circuit 35 so that the speed of the revolving field formed by the armature coil 5 will become equal to the speed of revolution of the field poles; the field poles 2a, 2b, therefore, gain a torque, being further accelerated. A starting torque is produced by positive feedback as described above, thus starting the engine.

Here, the armature current changeover circuit 35 changes the direction of the electric current flowing into the armature coil 5 in accordance with an output signal of the crank angle detector 6 in order to switch, for example during a certain period of time, the transistors 37, 40 and 42 to on, and the transistors 38, 39 and 41 to off, and also during a certain period of time, the transistors 38, 40 and 41 to on, and the transistors 37, 39 and 42 to off, so that the magnetic field formed by the armature coil 5 will become a revolving field constantly having a fixed phase difference ($\pi/2$) in relation to the magnetic field produced by the revolving-field poles 2a, 2b.

When the engine begins to operate, the speed of revolution of the field poles further rises, and accordingly the counter electromotive force produced at the armature coil 5 increases and no unnecessary starting current flows.

When the key switch is set in the IGNITION position after the starting of the engine, the starting and charging device body 1 operates as an a.c. synchronous generator, producing alternating current. This electric current thus produced is converted into the direct current by diodes 43 to 48, being supplied to the battery 25 and electrical equipment on the motor vehicle.

Conventional engine starting and charging devices are constituted as described above; when the engine begins to run, a very high current (for example, 150~200 A in a 12 V system) is supplied from the battery 25 to the armature coil 5. Therefore, at the time of engine starting (cranking), the battery voltage will drop as shown in FIG. 3.

The field coil 3 produces a specific amount of field force as the battery voltage is supplied. However, a field electromotive force decreases because of a decrease in the field coil 5 current, and, therefore, there is a problem that a desired motor torque is hard to obtain during engine cranking. A necessary amount of field electromotive force must be previously obtained even at the battery voltage that has decreased during engine cranking. In this case, however, there exists another problem that the use of a large-sized device is demanded because of an increase in the amount of copper to be used and in a space for the winding; the device wastes much when operated as a generator, and moreover can not properly perform both the starting and charging functions when used as a starting and charging device, becoming large in size and costly.

The present invention has been accomplished in an attempt to solve the above-mentioned problems of a prior art, and has as its object the provision of a light-weight, small-sized, low-priced engine starting and charging device that is capable of maintaining a sufficient field electromotive force for engine starting even at low battery voltage, and securing a necessary, sufficient field electromotive force with a little current when the device is used as a generator.

SUMMARY OF THE INVENTION

The engine starting and charging device of the present invention has field coils divided and wound into the plural, and is provided with a field coil control circuit which connects each of the field coils in parallel at the time of engine starting, and in series after the engine is started.

In the present invention, since the field coils are in parallel connection at the time of engine starting, a necessary field electromotive force can be obtained even at a lowered battery voltage. Further, after the engine starting, when the device functions as a generator, the connection of the field coils is switched to the series connection, thus producing a sufficient field electromotive force to accomplish its function.

BEST MODE OF THE INVENTION

A preferred embodiment of the present invention will now be explained by referring to the accompanying drawings.

Figure 1:
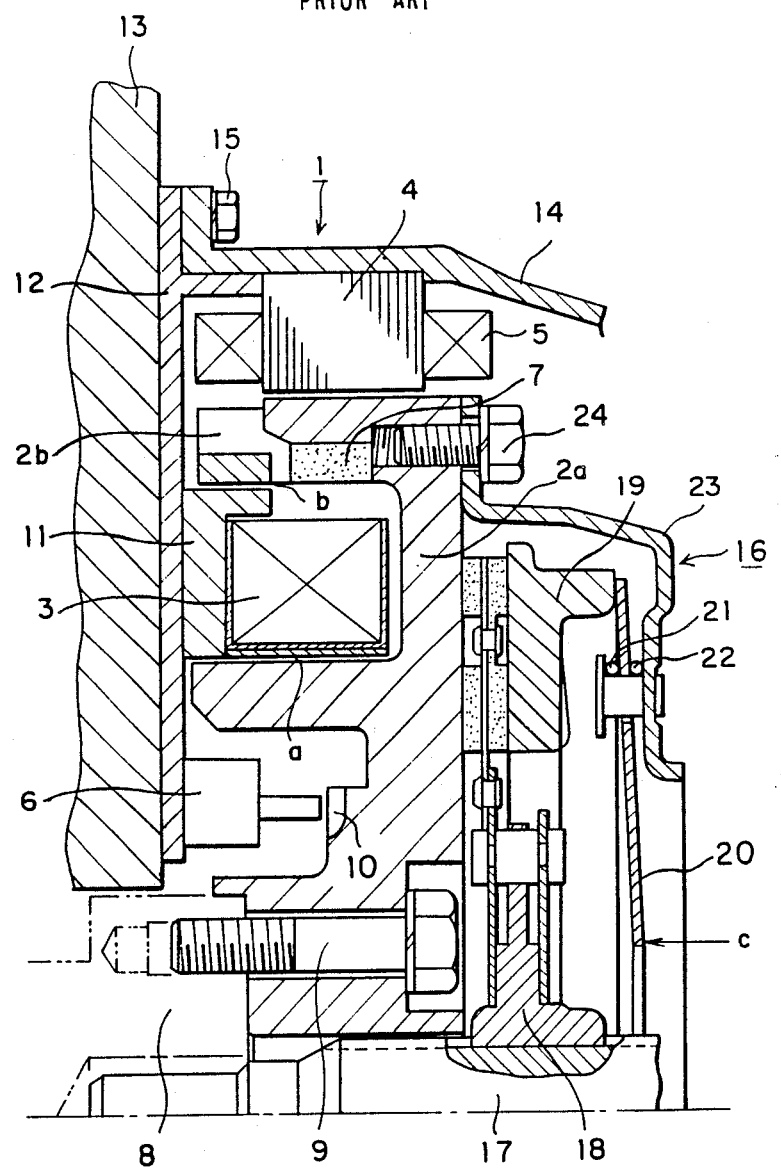
FIG. 1 is a sectional view of a prior-art engine starting and charging device.
Figure 2:
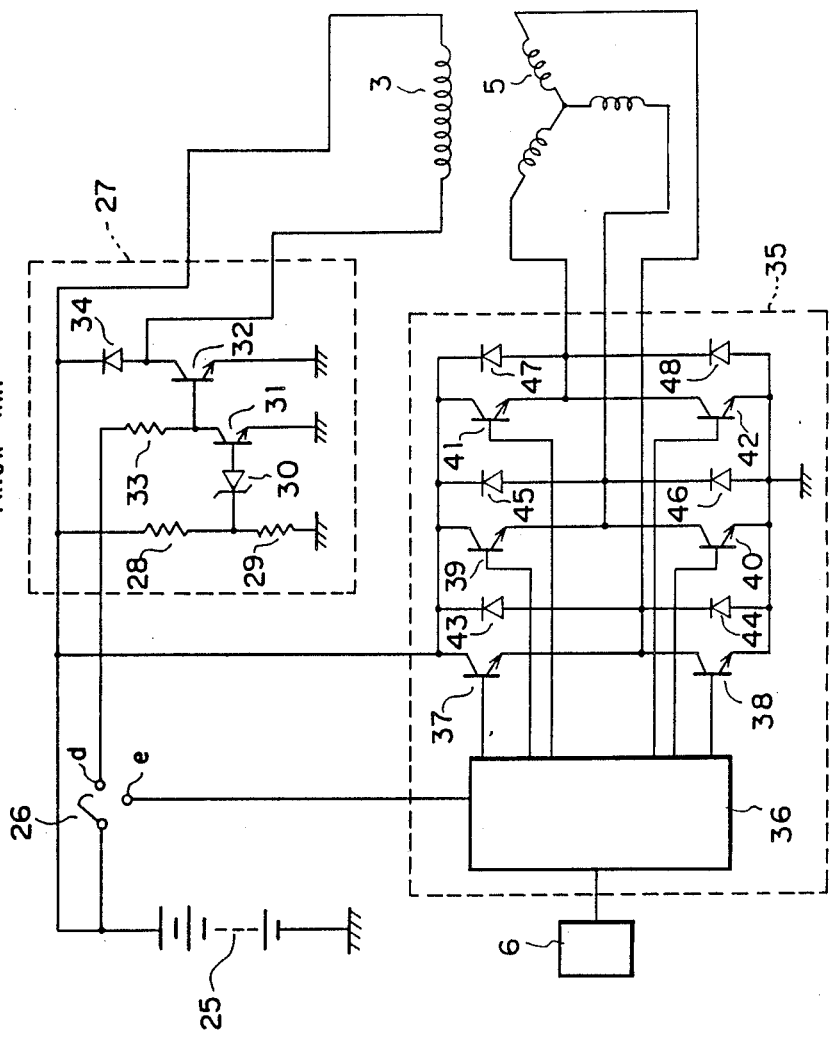
FIG. 2 is a circuit diagram of the same engine starting and charging device.
Figure 3:
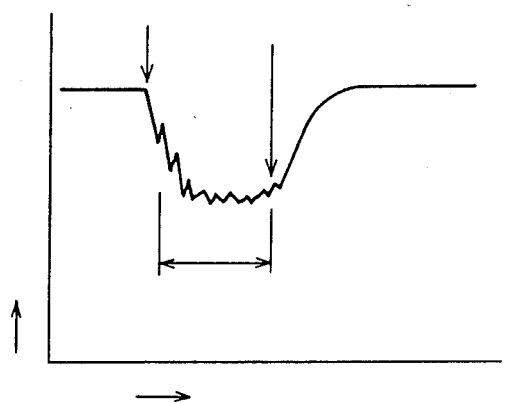
FIG. 3 is a voltage waveform diagram showing the state of battery voltage during engine starting.
Figure 4:
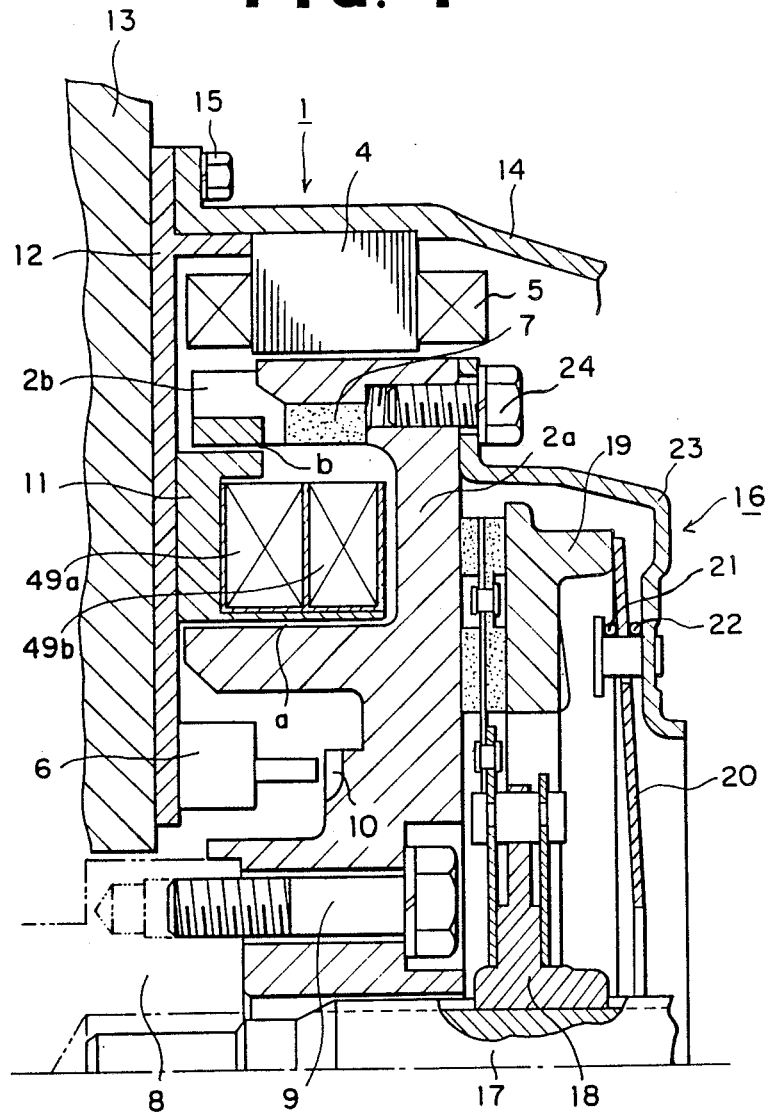
FIG. 4 is a sectional view showing an engine starting and charging device according to one embodiment of the present invention.
Figure 5:
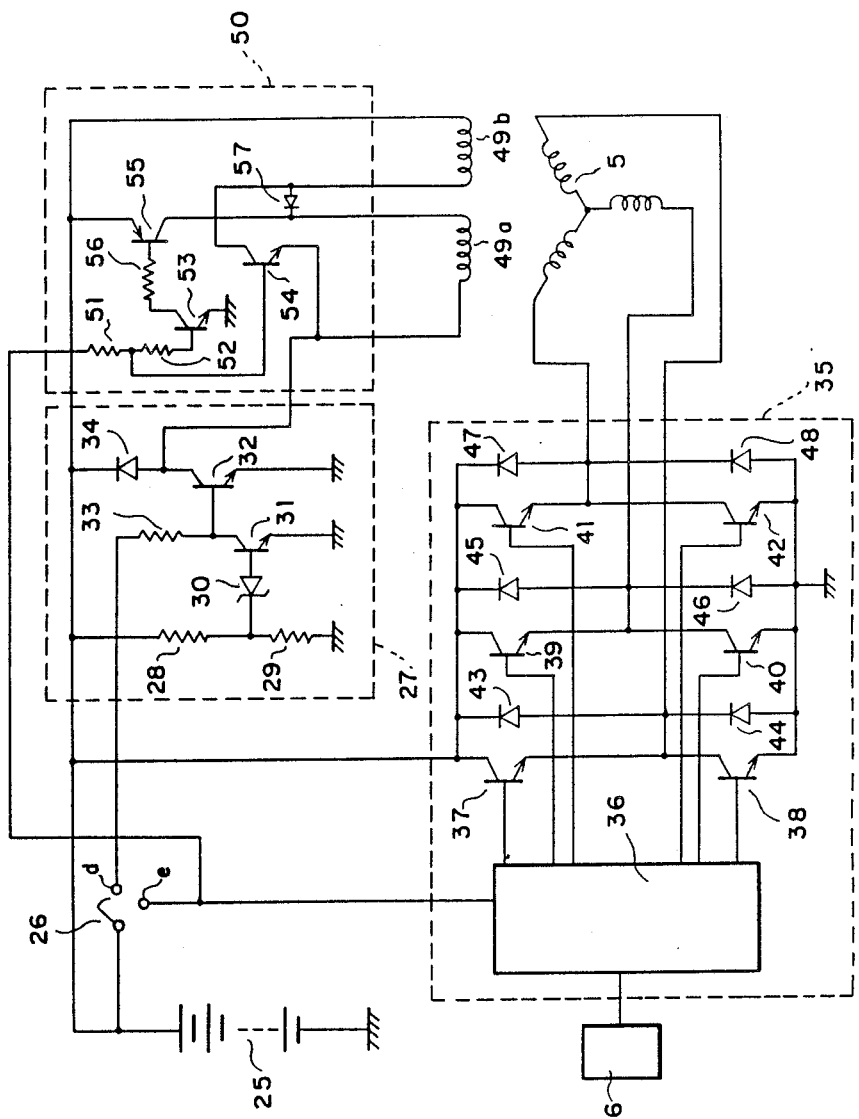
FIG. 5 is a circuit diagram of the same engine starting and charging device.

FIGS. 4 and 5 are a sectional view and a circuit diagram showing the engine starting and charging device in accordance with one embodiment of the present invention; these drawings correspond to FIGS. 1 and 2 of the prior-art device.

In these drawings, numerals 49a, 49b are field coils divided into two and wound. The series and parallel connections of these field coils 49a, 49b are controlled by a field coil control circuit 50 shown in FIG. 5.

In this field coil control circuit 50, numerals 51 and 52 designate base resistors, which are connected in series: the resistor 51 is connected to the contact e on the START side of the key switch 26, while the resistor 52 is connected to the base of an npn transistor 53, and the nodes of these resistors 51, 52 are connected to the base of an npn transistor 54.

Numeral 55 is an npn transistor with its emitter connected to the positive terminal of the battery 25, with its base connected to the collector of the transistor 53 through a resistor 56, and with its collector connected to one end of the field coil 49a. The emitter of the transistor 53 is grounded.

One end of the aforementioned field coil 49b is connected to the positive terminal of the battery 25, while the other end is connected to one end of the field coil 49a via a diode 57 for preventing a reverse current, and also to the collector of the transistor 54. The other end of the field coil 49a is connected to the emitter of the transistor 54 and also to the collector of the transistor 32 in the voltage regulator 27.

Subsequently, the operation of the engine starting and charging device of the above-mentioned constitution will be explained. First, when the key switch 26 is placed in the START position to start the engine, the battery voltage is supplied to the armature current changeover circuit 35 via the contact e on the START side, and the electric current flows into the armature coil 5 and the current is supplied to the field coil control circuit 50, energizing the transistors 53 and 54.

Accordingly the transistor 55 is also energized, and the battery voltage is applied to the field coil 49b and at the same time to the field coil 49a through the transistor 55. The electric current flowing through the field coil 49b flows into the transistor 32 via the transistor 54, and the current passing through the field coil 49a flows into the transistor 32. That is, the field coils 49a, 49b are in parallel connection in relation to the battery 25, thereby enabling the flow of sufficient field coil current even at a lowered battery voltage to produce a required field electromotive force to start the engine.

Next, after the engine is started, when the key switch 26 moves away from the contact e on the START side but remains in connection only with the contact d on the IGNITION side, the voltage from the contact e on the START side is not applied to the field coil control circuit 50, thus deenergizing all of the transistors 53, 54 and 55. Therefore, the field coils 49b and 49a are connected in series through the normal direction of the diode 57, producing a sufficient field electromotive force required to accomplish the function of the device as a generator.

In the embodiment described above, the field coils 49a, 49b have been divided into two parts; and therefore the battery voltage for producing an equal field electromotive force in the series and parallel connections will be about one half less in the parallel connection than in the series connection. The field coil may be divided into more than two plural parts.

In the aforementioned starting and charging device, the operation of the clutch 16 is similar to that of the device of prior art, the explanation of which, therefore, will be omitted here.

Furthermore, in the aforementioned embodiment, the field coil control circuit 50 is constituted of semiconductor elements, but should not be limited thereto; for example, the circuit constituted by combining an electromagnetic switch and so on can present a similar effect as the aforementioned embodiment.

What is claimed is:

1. An engine starting and charging device, comprising: revolving-field poles mounted on a crankshaft of engine; field coils which are divided in the plural number and wound about a field core secured to an engine body and excite said revolving field poles; an armature core secured on said engine body and an armature coil wound thereabout; a crank angle detector which detects the angle of rotation of said revolving-field poles; an armature current changeover circuit which changes the direction of the electric current flowing into said armature coil in accordance with an output signal produced by said crank angle detector such that, at the time of engine starting, said armature coil will form a revolving field having a specific phase difference in relation to the field of said revolving-field poles; a rectifying means which converts the voltage produced by said armature coil into the direct current after engine starting; and a field coil control circuit which connects in parallel said field coils that have been divided in the plural number described above, at the time of engine starting, and in series after engine starting.

2. An engine starting and charging device as claimed in claim 1, wherein said field core is fixed on a bracket and said armature core is fixed on a housing.

3. An engine starting and charging device as claimed in claim 1, wherein said bracket and housing are attached to said engine body with common bolts.

4. An engine starting and charging device as claimed in claim 2, wherein a semiconductor element is used as a switch.

5. An engine starting and charging device as claimed in claim 2, wherein an electromagnetic switch is used as said switch.

6. An engine starting and charging device, comprising: revolving-field poles mounted on a crankshaft of engine; field coils which are divided in the plural number and wound about a field core secured to an engine body and excite said revolving field poles; an armature core secured on said engine body and an armature coil wound thereabout; a crank angle detector which detects the angle of rotation of said revolving-field poles; an armature current changeover circuit which changes the direction of the electric current flowing into said armature coil in accordance with an output signal produced by said crank angle detector such that, at the time of engine starting, said armature coil will form a revolving field having a specific phase difference in relation to the field of said revolving-field poles; a rectifying means which converts the voltage produced by said armature coil into the direct current after engine starting; and a field coil control circuit that is constituted by connecting in series a switch which is opened after engine starting, to each of the field coils divided into two parts, connecting the switch side of one field coil to said battery and said field coil side of another field coil to said battery, and connecting a diode between nodes of said each field coil and said switch.

* * * * *